(12) United States Patent
Kawata et al.

(10) Patent No.: US 8,004,637 B2
(45) Date of Patent: Aug. 23, 2011

(54) OPERATIVE REFLECTION AND ABSORPTION PLATE AND DISPLAY ELEMENT USING THE SAME

(75) Inventors: Yasushi Kawata, Ageo (JP); Yuuzo Hisatake, Fukaya (JP); Masaki Obi, Ageo (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 160 days.

(21) Appl. No.: 12/271,066

(22) Filed: Nov. 14, 2008

(65) Prior Publication Data

US 2009/0066894 A1    Mar. 12, 2009

Related U.S. Application Data

(63) Continuation of application No. PCT/JP2007/058636, filed on Apr. 20, 2007.

(30) Foreign Application Priority Data

May 17, 2006    (JP) .................................. 2006-138057

(51) Int. Cl.
*G02F 1/1335*    (2006.01)
*G02B 5/08*    (2006.01)

(52) U.S. Cl. ........................................ 349/113; 359/884
(58) Field of Classification Search .................. None
See application file for complete search history.

(56) References Cited

U.S. PATENT DOCUMENTS

| | | | | |
|---|---|---|---|---|
| 5,868,951 | A | * | 2/1999 | Schuck et al. ................... 216/24 |
| 6,175,442 | B1 | * | 1/2001 | Booth et al. ................... 359/290 |
| 2004/0169791 | A1 | * | 9/2004 | Nilsen et al. .................... 349/96 |

FOREIGN PATENT DOCUMENTS

| JP | 2003-270680 | 9/2003 |
|---|---|---|
| JP | 2005-99467 | 4/2005 |

OTHER PUBLICATIONS

International Search Report from the Japanese Patent Office for International Application No. PCT/JP2007/058636.

* cited by examiner

*Primary Examiner* — Sarah Hahm
(74) *Attorney, Agent, or Firm* — Finnegan, Henderson, Farabow, Garrett & Dunner, L.L.P.

(57) ABSTRACT

An operative reflection and absorption plate including a substrate having a moth eye structure on its surface is used, whereby an absorbing status and a reflecting status can be realized without using a polarizing plate, and a display element exhibiting a bright and high contrast can be obtained.

6 Claims, 3 Drawing Sheets

OPERATIVE REFLECTION AND ABSORPTION PLATE AND DISPLAY ELEMENT USING THE SAME

CROSS-REFERENCE TO RELATED APPLICATIONS

This is a Continuation application of PCT Application No. PCT/JP2007/058636, filed Apr. 20, 2007, which was published under PCT Article 21(2) in Japanese.

This application is based upon and claims the benefit of priority from prior Japanese Patent Application No. 2006-138057, filed May 17, 2006, the entire contents of which are incorporated herein by reference.

BACKGROUND OF THE INVENTION

1. Field of the Invention

The present invention relates to an operative reflection and absorption plate, which can be controlled by an external stimulus, and a display element using the operative reflection and absorption plate.

2. Description of the Related Art

For example, a liquid crystal display device uses a polarizing plate as an optical film for converting an optical wave. An incident light is decomposed into orthogonal polarization components, for example, a perpendicular polarization component and a horizontal polarization component by a polarizing plate, and any one of these polarization components is separated and transmitted to be used in the liquid crystal display device. According to this constitution, orientation change of liquid crystal molecules due to application of an electric field and a polarization state of the incident light due to optical rotation and birefringence due to the orientation change can be visualized as strength and weakness of light.

However, the other polarization component is absorbed and lost, whereby the brightness of the display surface is reduced. Thus, the brightness in the liquid crystal display device has been required to be enhanced.

An operative reflection and absorption plate according to the present invention comprises a substrate having a moth eye structure on its surface.

A display element according to the present invention comprises an operative reflection and absorption plate comprising a substrate having a moth eye structure on its surface.

BRIEF SUMMARY OF THE INVENTION

The invention has been made in view of the problem, and it is an object of the invention to provide a reflection and absorption plate, which can realize an absorbing status and a reflecting status without using a polarization plate and provides a bright and high contrast, and a display element using the reflection and absorption plate.

DETAILED DESCRIPTION OF THE INVENTION

Figure 1:
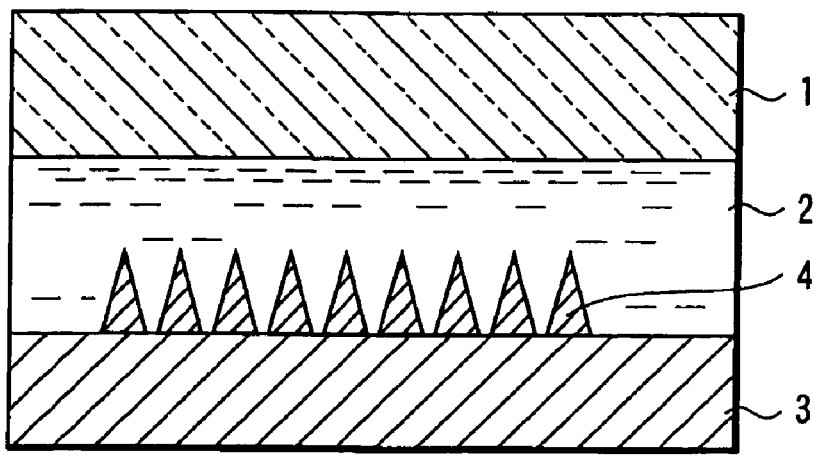
FIG. 1 is a cross-sectional view showing a constitution of an example of a typical display element according to the invention.

The reflection and absorption plate of the invention has a substrate having a moth eye structure.

The moth eye structure, as its name suggests, is similar to the structure of moth's eyes and has a minute concavoconvex shape in which conical protrusions with a height of about several tens to several hundred nm are spread, whereby a continuous change in a refractive index field occurs.

A reflectable material is used as a substrate, and a moth eye structure with a minute concavoconvex shape is formed on its surface, whereby, when light entering between each protrusion multiply reflected on the walls of the protrusions, the refractive index is continuously reduced. According to this constitution, the light is finally absorbed to allow black display. Meanwhile, the moth eye structure is shielded by a reflective material, or the concavoconvex shape is apparently planarized, whereby the light is reflected to allow white display. Thus, according to the invention, the white and black display can be easily provided without using a polarization plate.

Each pitch in the minute concavoconvex shape is preferably not more than a visible light wavelength level. Further, when a plurality of minute concavoconvex shapes are formed as a unit, a reflected light is colored in a case where a pith between the units exists in a range of the visible light wavelength. Meanwhile, when the pitch does not exist in the range of the visible light wavelength, uncolored reflection can be obtained. Thus, it is preferable that the pitch between the units is changed depending on the specifications.

The protrusion of the minute concavoconvex shape of the moth eye structure used in the invention preferably has a size of about 150 nm to 500 nm in the height direction of the protrusion and about 150 nm to 400 nm in the width direction of the protrusion. Further, the pitch between the heads of the protrusions is desirable 150 nm to 400 nm.

As a material constituting the minute concavoconvex shape, a material which can self support the concavoconvex structure having the above size can be basically used. In addition, in view of reflection and absorption contrast up, the refractive index establishing a relation represented by the following formula is preferably provided between a substrate having the minute concavoconvex shape and a medium including a concavoconvex structure:

surface region refractive index of concavoconvex shape−refractive index of medium with refractive index changed by external stimulus≧0.5.

Further, the material constituting the concavoconvex shape is preferably an opaque substrate exhibiting metallic luster so that an incident light is easily reflected from the substrate, whereby it becomes possible to form a pixel electrode constituting a reflective display element without separately forming, for example, a film for reflection on a concavoconvex surface.

As the medium with the refractive index changed by an external stimulus, any materials can be used as long as the refractive index of the medium can be controlled by an electromagnetic field. Particularly, a liquid crystal material in which the refractive index can be controlled by an electric field and a magnetic field and a liquid exhibiting a Kerr effect can be used as the medium. A liquid crystal panel manufacturing technique can be also used, whereby it is advantageous in terms of productivity.

As other material which can be used as the media with the refractive index changed by an external stimulus, there is a material in which a low refractive index medium and a high refractive index medium, which are subjected to charging treatment, are phase-separated. In this case, nanoparticles of a high refractive index material such as $TiO_2$ are dispersed, whereby inorganic and organic liquids normally having a not so high refractive index can be used as a liquid used in the high refractive index medium; therefore, there is the advantage of increasing a material selection range.

A fluorinated solvent, for example, can be used as the inorganic liquid, and a silicone oil, for example, can be used as the organic liquid.

An average change in a refractive index field formed of the minute concavoconvex shape is controlled by the electromagnetic field, and therefore, the thickness of the medium with the refractive index changed by an external stimulus is preferably larger than at least the maximum height of the minute concavoconvex shape. In general, the maximum height of the minute concavoconvex shape is several hundred nm; however, considering to the mass productivity, it is very difficult to uniformly control the thickness of the medium, having the changed refractive index, to several hundred nm. Thus, in view of the yield, the thickness of the medium is preferably set to the thickness practically used in a liquid crystal display element and other flat panel display techniques, for example, about several μm.

Hereinafter, the invention is described in more detail with reference to drawings.

FIG. 1 is a cross-sectional view showing a constitution of an example of a typical display element according to the invention.

As shown in FIG. 1, a medium 2 with a refractive index changed by an external stimulus due to an electromagnetic field is filled between a reflecting substrate 3 with a moth eye structure having a minute concavoconvex shape 4 and a transparent substrate 1. A refractive index na of the reflecting substrate 3 with the minute concavoconvex shape 4, a refractive index nb of the medium 2 in which the refractive index can be controlled by the electromagnetic field, and a refractive index nb' in such a state that the electromagnetic field is applied establish the following formulae:

$|na-nb|<0.2$ $|na-nb'|>0.5$

Figure 2:
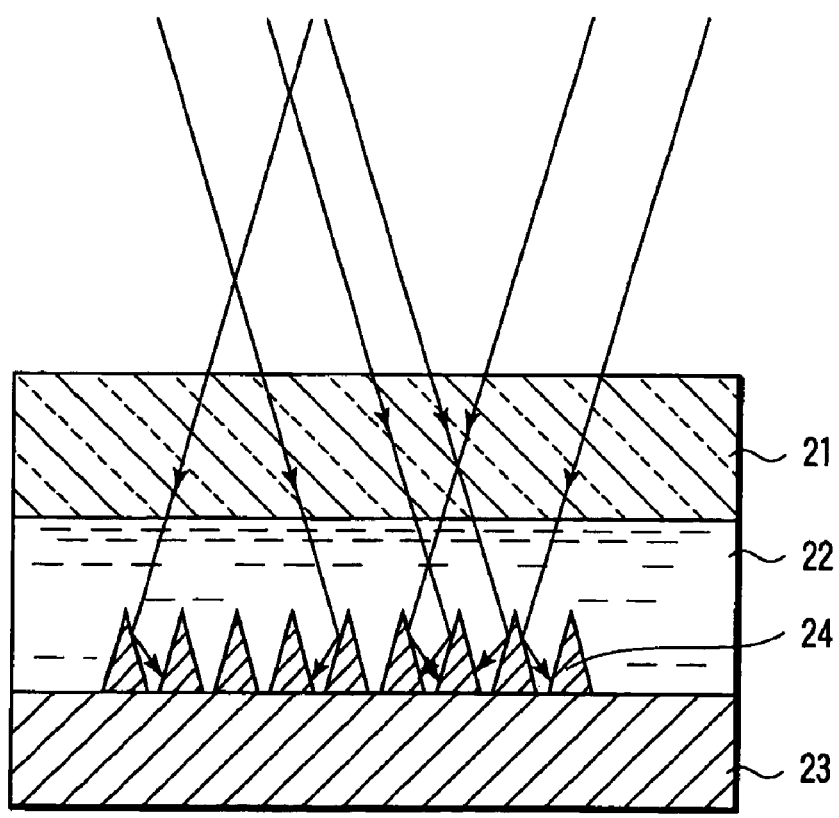
FIG. 2 is a view showing a state that an incident light is absorbed by a moth eye structure having a minute concavoconvex shape.
Figure 3:
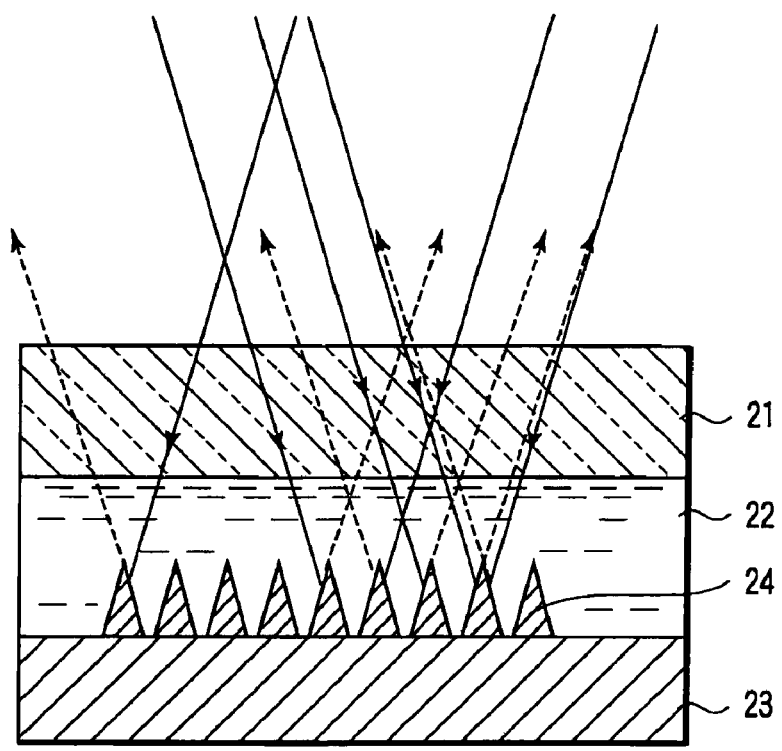
FIG. 3 is a view showing a state that an incident Light is reflected by a moth eye structure having a minute concavoconvex shape.

FIG. 2 shows a stat that an incident light is absorbed by a moth eye structure with a minute concavoconvex shape. FIG. 3 shows a state that the incident light is reflected from the moth eye structure with the minute concavoconvex shape.

In FIG. 2, the electromagnetic field is applied. When na−nb'>0.5, na<nb, and the difference in the refractive index between a minute concavoconvex shape 24 of a substrate 23 and a medium 22 provided on the substrate 23 is increased, whereby the average change in the refractive index field occurs to reduce the reflectance to not more than 1%. The reflection and absorption plate of the invention operates as a light absorption plate, whereby white display obtained by reflection and black display obtained by absorption can be performed.

Meanwhile, in FIG. 3, the electromagnetic field is not applied, and when na−nb<0.2, na>nb, whereby the difference in the refractive index between the minute concavoconvex shape 24 of the substrate 23 and the medium 22 provided on the substrate 23 is reduced. Therefore, the average change in the refractive index field does not occur, whereby the reflection and absorption plate of the invention operates as a mere reflection plate.

Incidentally, a reference numeral 21 denotes a transparent substrate.

Thus, a polarizing plate is not required by using the reflection and absorption plate of the invention, whereby it is possible to easily provide a display element with a high reflective performance and a high contrast.

EXAMPLES

Hereinafter, in order to describe the invention in detail, the best modes for carrying out the invention will be described. These examples are described in order to easily understand the invention, but the invention is not limited to these examples. It goes without saying that the invention can be variously changed to be used in the scope of the subject matter of the invention.

Example 1

Figure 4:
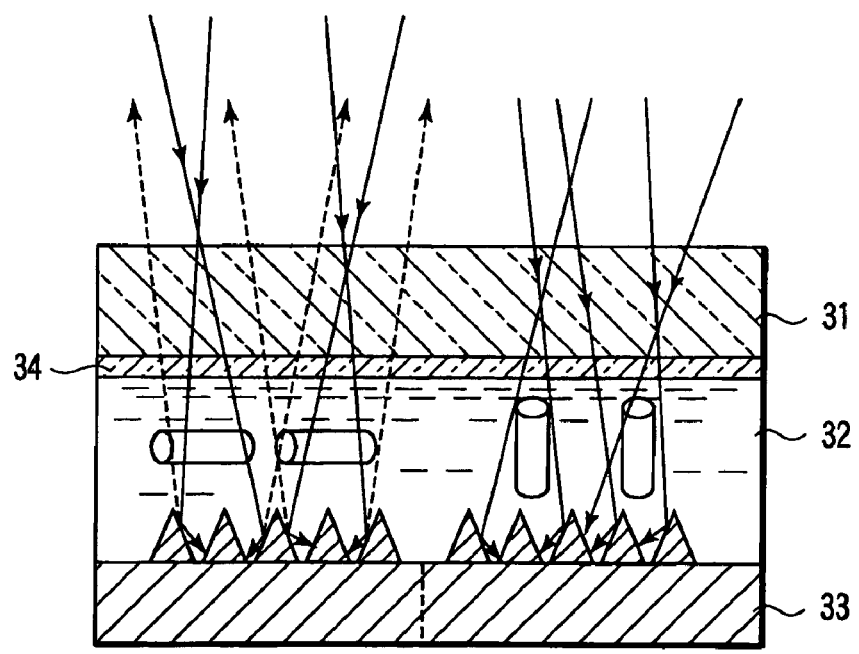
FIG. 4 is a schematic cross-sectional view for explaining the operation of a first example of the display element of the invention.

FIG. 4 is a schematic cross-sectional view for explaining the operation of a first example of the display element of the invention.

As a substrate 33, an Ni electrode plate with a surface subjected to a minute concavoconvex shape processing and a glass substrate 31 with a transparent electroconductive film 34 formed on its principal surface are provided. The substrate 33 and the glass substrate 31 are applied together so that protrusions of a minute concavoconvex shape, which has a size of 200 nm to 300 nm in the height direction of the protrusion and about 480 nm in the pitch direction of the protrusion, are arranged at a constant interval. The surfaces where the substrates 31 and 33 face each other are subjected to chemical treatment by using N, N-dimethyl-N-octadecyl-3-aminopropyltrimethoxysilylchloride (DMOAP) as a vertical orientation treatment agent so that liquid crystal molecules are vertically orientated. A liquid crystal material 32 with a refractive index anisotropy of 0.3 (ne=1.75, no=1.45) is filled between the substrates 31 and 33 to thereby constitute a reflective liquid crystal display element.

In the right half of FIG. 4, a voltage is not applied, and in the left half of FIG. 4, a voltage is applied.

As shown in FIG. 4, when a voltage is not applied, the incident light is absorbed by the minute concavoconvex shape to provide black display. When a voltage is applied to the transparent electroconductive film 34 formed on the glass substrate 31 and an Ni electrode with a minute concavoconvex shape on the substrate 33 to thereby change the liquid crystal molecule orientation, the incident light is reflected to provide white display.

As a result, it can be confirmed that the average change in the refractive index field adjacent to the minute concavoconvex shape is controlled to exhibit reflecting and absorbing statuses.

Meanwhile, when the brightness and contrast are compared in a reflective liquid crystal display element constituted as in Example 1 except that an Ni electrode plate without the minute concavoconvex shape and a glass substrate with a polarizing film and a transparent electroconductive film are used, Example 1 shows better brightness and contrast.

Example 2

Figure 5:
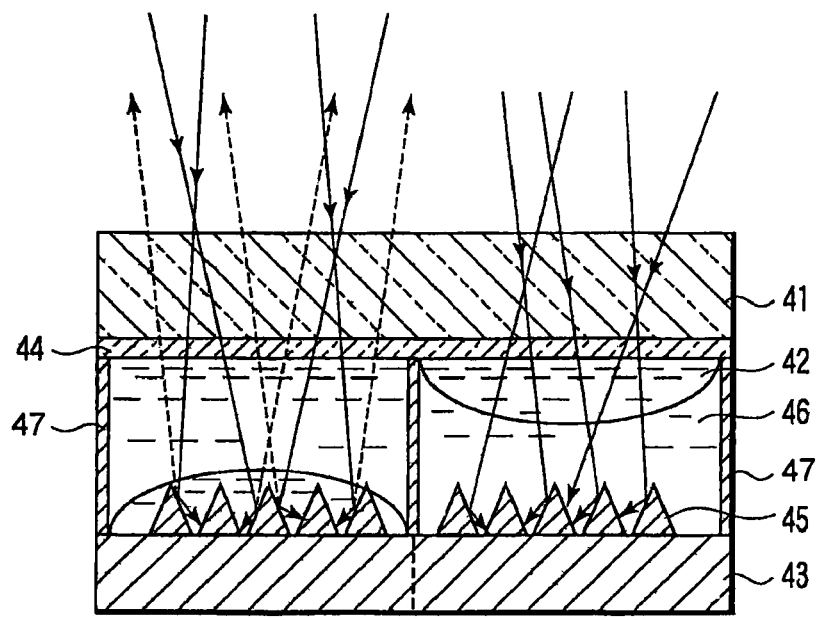
FIG. 5 is a schematic cross-sectional view for explaining the operation of a second example of the display element of the invention.

FIG. 5 is a schematic cross-sectional view for explaining the operation of a second example of the display element of the invention.

As shown in FIG. 5, as with Example 1, a substrate 43 in which an electrode with a minute concavoconvex shape 45 is formed of Ni and a glass substrate 41 with a transparent electroconductive film 44 formed thereon are applied together so that they are disposed at a constant interval. The electrode with the minute concavoconvex shape 45 is separated by a partition 47 in units of pixels. A fluorinated solvent 42 and a silicone oil 46 in which $TiO_2$ nanoparticles subjected to charging treatment are dispersed are filled between the substrates 41 and 43, whereby a reflective display element is constituted. The fluorinated solvent 42 has a refractive index of 1.26, and the silicone oil 46 has a refractive index of 1.76.

A voltage is applied to the transparent electroconductive film 44 formed on the glass substrate 41 and the Ni electrode with the minute concavoconvex shape 45 on the substrate 43, whereby the silicone oil with $TiO_2$ nanoparticles dispersed therein is moved between the substrates.

In the left half of FIG. 5, a voltage is applied, and in the right half of FIG. 5, a voltage is not applied.

As shown in FIG. 5, when a voltage is applied, the silicone oil with $TiO_2$ nanoparticles dispersed therein is moved to the Ni electrode side, and the minute concavoconvex shape 45 is apparently filled with the silicone oil, whereby the incident light is reflected without touching the minute concavoconvex shape 45 on the Ni electrode to provide white display.

Meanwhile, when a voltage is not applied, the silicone oil with $TiO_2$ nanoparticles dispersed therein is moved to the transparent electroconductive film 44 side to be absorbed by the minute concavoconvex shape 45, whereby black display can be provided.

As a result, it can be confirmed that the average change in the refractive index field adjacent to the minute concavoconvex shape is controlled to exhibit reflecting and absorbing statuses.

Example 3

Figure 6:
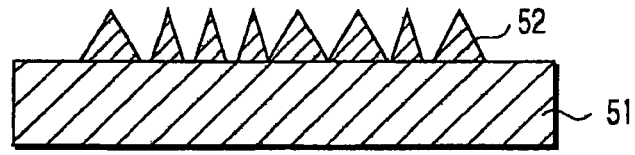
FIG. 6 is a schematic cross-sectional view showing a second example of an Ni electrode plate subjected to a minute concavoconvex shape processing.

FIG. 6 is a schematic cross-sectional view showing a second example of an Ni electrode plate subjected to a minute concavoconvex shape processing.

The reflective display element is formed by the constitution of Example 1, using an Ni electrode plate subjected to the minute concavoconvex shape processing which has different period and pitch from the Ni electrode plate subjected to the minute concavoconvex shape processing in Example 1. A voltage is applied to a transparent electroconductive film formed on a glass substrate surface and an Ni electrode with a minute concavoconvex shape to thereby change the liquid crystal molecule orientation. As a result, it can be confirmed that the average change in the refractive index field adjacent to the minute concavoconvex shape is controlled to exhibit reflecting and absorbing statuses.

Example 4

Figure 7:
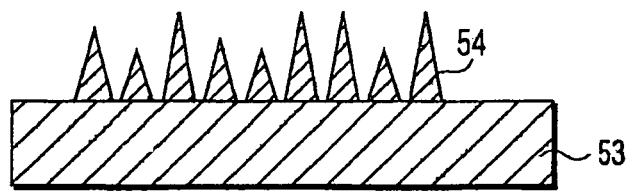
FIG. 7 is a schematic cross-sectional view showing a third example of an Ni electrode plate subjected to a minute concavoconvex shape processing.

FIG. 7 is a schematic cross-sectional view showing a third example of an Ni electrode plate subjected to the minute concavoconvex shape processing.

A reflective display element is formed by the constitution of Example 1, using an Ni electrode plate with a minute concavoconvex shape 52 having a different height of FIG. 7. A voltage is applied to a transparent electroconductive film formed on a glass substrate surface and an Ni electrode with a minute concavoconvex shape to thereby change the liquid crystal molecule orientation. As a result, it can be confirmed that the average change in the refractive index field adjacent to the minute concavoconvex shape is controlled to exhibit reflecting and absorbing statuses.

Example 5

Figure 8:
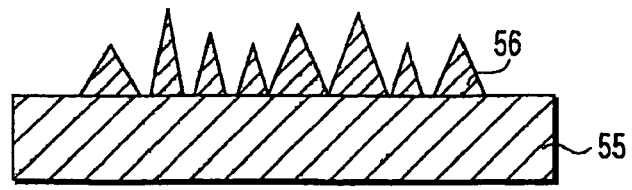
FIG. 8 is a schematic cross-sectional view showing a fourth example of an Ni electrode plate subjected to a minute concavoconvex shape processing.

FIG. 8 is a schematic cross-sectional view showing a fourth example of an Ni electrode plate subjected to the minute concavoconvex shape processing.

A reflective display element is formed by the constitution of Example 2, using a minute concavoconvex shape having different period, pitch, and height of FIG. 8. A voltage is applied to a transparent electroconductive film formed on a glass substrate surface and an Ni electrode with a minute concavoconvex shape to thereby change the liquid crystal molecule orientation. As a result, it can be confirmed that the average change in the refractive index field adjacent to the minute concavoconvex shape is controlled to exhibit reflecting and absorbing statuses.

Thus, according to the invention, the absorbing status and the reflecting status can be realized without using a polarizing plate, and a reflection and absorption plate exhibiting a bright and high contrast and a display element can be obtained.

What is claimed is:

1. An operative reflection and absorption plate comprising:
a substrate having a moth eye structure, the moth eye structure having a concavoconvex shape and comprising a plurality of conical protrusions formed on a surface of the substrate; and
a medium having a refractive index changeable by an external stimulus, the medium being located on the surface of the substrate and comprising a first material with a low refractive index and a second material with a high refractive index, the first and second materials being subjected to charging treatment and being phase-separated.

2. The operative reflection and absorption plate according to claim 1, wherein the medium has a birefringence.

3. The operative reflection and absorption plate according to claim 2, wherein the medium comprises a liquid crystal material.

4. A display element comprising an operative reflection and absorption plate, the plate comprising:
a substrate having a moth eye structure, the moth eye structure having a concavoconvex shape and comprising a plurality of conical protrusions formed on a surface of the substrate; and
a medium having a refractive index changeable by an external stimulus, the medium being located on the surface of the substrate and comprising a first material with a low refractive index and a second material with a high refractive index, the first and second materials being subjected to charging treatment and being phase-separated.

5. The display element according to claim 4, wherein the medium has a birefringence.

6. The display element according to claim 5, wherein the medium comprises a liquid crystal material.

* * * * *